(No Model.) 3 Sheets—Sheet 1.

J. R. WILLIAMS.
MACHINE FOR CUTTING OUT CIGAR WRAPPERS OR BINDERS.

No. 400,153. Patented Mar. 26, 1889.

WITNESSES:
William B. Ellison

INVENTOR
John R. Williams,
BY Chas. C. Gill
ATTORNEY (No Model.) 3 Sheets—Sheet 3.

J. R. WILLIAMS.
MACHINE FOR CUTTING OUT CIGAR WRAPPERS OR BINDERS.

No. 400,153. Patented Mar. 26, 1889.

WITNESSES:
William B. Ellison
W. A. C. Matthie

INVENTOR
John R. Williams,
BY
Chas. C. Gill
ATTORNEY

UNITED STATES PATENT OFFICE.

JOHN R. WILLIAMS, OF NEWARK, NEW JERSEY, ASSIGNOR TO THE JOHN R. WILLIAMS COMPANY, OF NEW YORK, N. Y.

MACHINE FOR CUTTING OUT CIGAR WRAPPERS OR BINDERS.

SPECIFICATION forming part of Letters Patent No. 400,153, dated March 26, 1889.

Application filed September 6, 1888. Serial No. 284,712. (No model.)

*To all whom it may concern:*

Be it known that I, JOHN R. WILLIAMS, a citizen of the United States, and a resident of Newark, in the county of Essex and State of New Jersey, have invented certain new and useful Improvements in Machines for Cutting Out Cigar Wrappers or Binders, of which the following is a specification.

The invention relates to improvements in machines for cutting out cigar wrappers or binders; and it consists in novel mechanism, hereinafter specifically described, for cutting the blanks for the wrappers or binders and affording a surface or table upon which the wrappers or binders may be rolled around the "filler," the leaf while subjected to the operation of cutting or rolling being held by air-pressure.

The invention will be fully understood from the detailed description hereinafter presented, reference being had to the accompanying drawings, in which—

Figure 1:
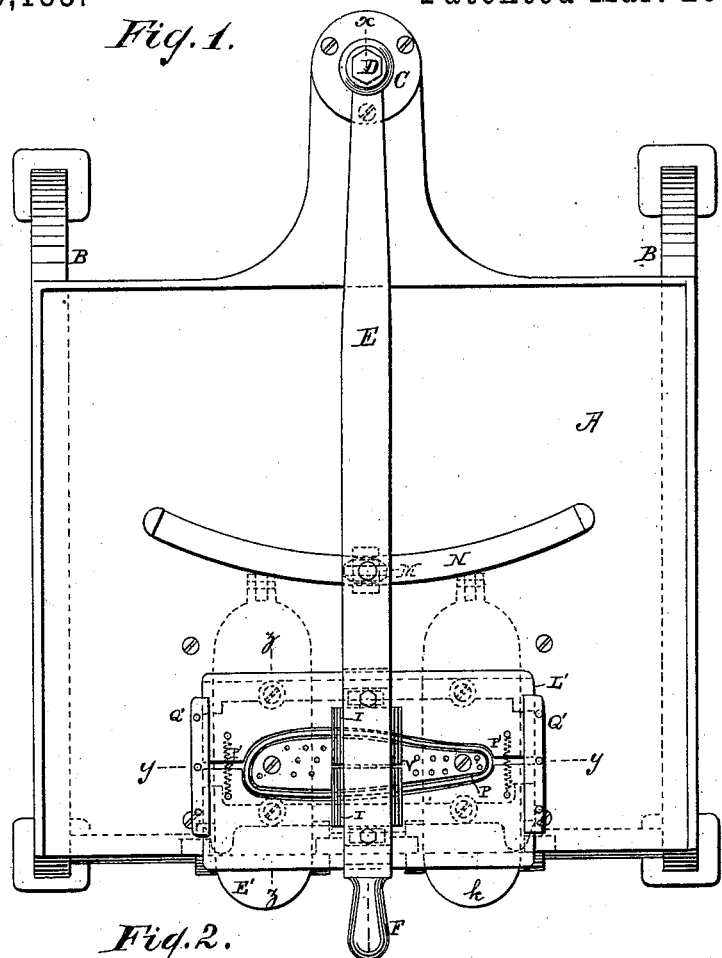
Figure 2:
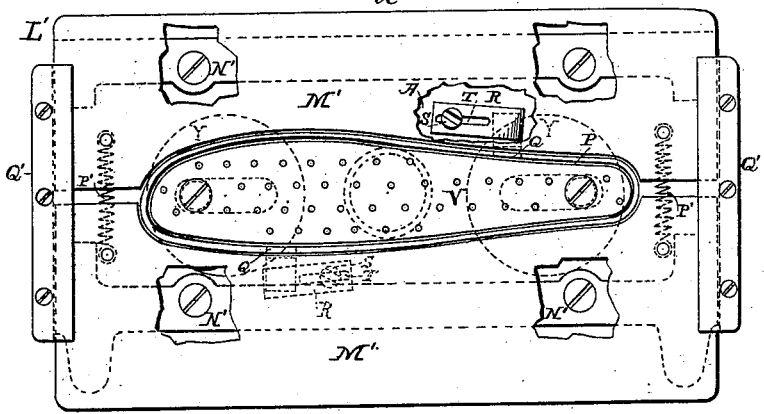
Figure 3:
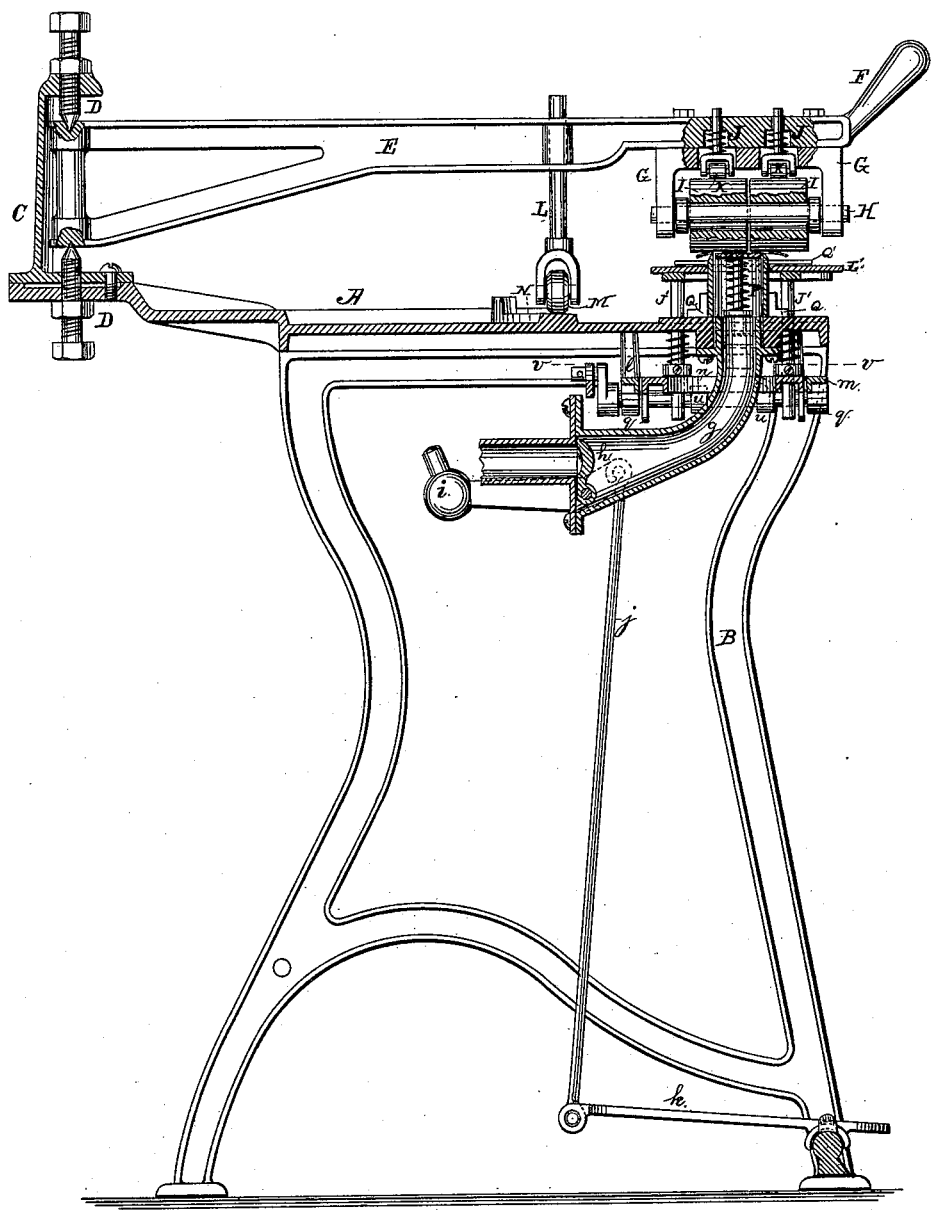
Figure 4:
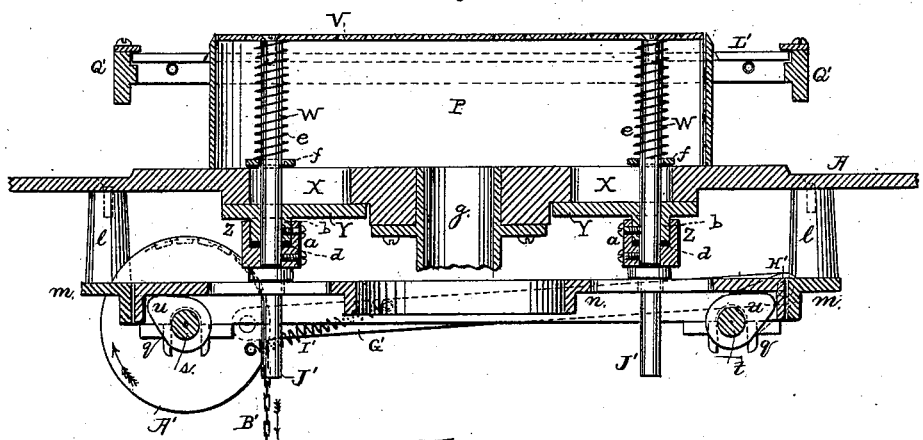
Figure 5:
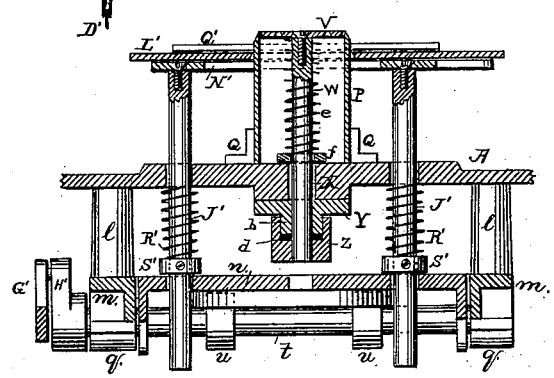
Figure 6:
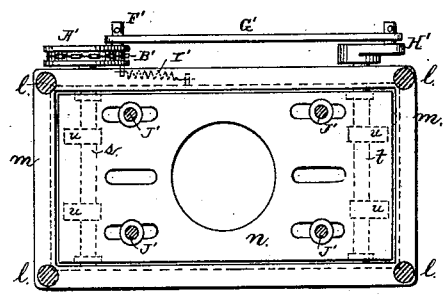

Figure 1 is a top view of a machine embodying the elements of the invention. Fig. 2 is an enlarged detached top view of the cutting-die and rolling-table; Fig. 3, a vertical longitudinal section of the machine on the dotted line $x$ $x$ of Fig. 1; Fig. 4, an enlarged vertical section on the dotted line $y$ $y$ of Fig. 1; Fig. 5, an enlarged vertical section on the dotted line $z$ $z$ of Fig. 1, and Fig. 6 a horizontal section looking downward on the dotted line $v$ $v$ of Fig. 3.

In the drawings, A designates the bed-plate of the machine, said plate being suitably supported on legs B, and sustaining on its rear portion the standard C, which affords a bearing between the adjusting pivot-screws D D for the swinging arm E. The arm E has a handle, F, at its front end and carries the hanger G, in which is journaled the axle H, for the pressure-rollers I I, as shown in Fig. 3. The rollers I I are loosely mounted on the axle H, and each is given a downward tension by the springs J J through the smaller rollers, K K. The arm E also carries the hanger L, having at its lower end the wheel M, adapted to travel on the track N, formed on the bed-plate A. The arm E with the spring-pressure rollers I I and wheel M are embraced in Letters Patent No. 297,897, granted to me April 29, 1884, and are not independently claimed herein.

Upon the front portion of the bed-plate A, and in the line of the arc of travel of the rollers I I, is secured the upturned die P, whose outline corresponds with that of the blank to be cut, and which has affixed to its opposite sides the angle-plate lugs Q Q, adapted to be held (at their horizontal arms) upon the bed-plate A by the clamps R R, which are secured to said bed-plate by screws S S passing through elongated slots T T in the clamps, the latter being rendered adjustable with respect to their relation with the lugs Q Q by the elongated slots through which the screws S S pass. Within and closely fitting the upper edges of the die P is arranged the perforated platen V, which is secured by screws to the upper ends of the rods W W, located at the ends of the die, as shown in Fig. 4, and passing downward through the elongated slots X, disks Y, and caps Z, the said disks and caps at each end of the die being connected together and to the rods W by means of the screws $a$.

Between the hubs $b$ on the under side of the disks Y and the caps Z are applied flexible washers or packing $d$, forming air-tight joints. The disks Y are close against the under side of the bed-plate A and close the elongated slots X. Within the walls of the die P the rods W W are inclosed by the coiled springs $e$, which are held between the washers $f$ and platen V and exert an upward pressure against the latter, allowing the same a suitable yielding tension, adapting it for the varying conditions of the leaf to be cut upon the die when the machine is in use.

In the bed-plate A, and at a point within the walls of the die or cutter P, is provided an aperture adapted to receive the end of the pipe $g$, which in use will be connected with an ordinary suction blower or exhaust, (not shown,) whereby the leaf placed upon the die may be held close against the platen V by air-suction in a well-known manner. In the pipe $g$ is pivoted the valve $h$, having the weight $i$ to close it, and being connected through the pitman-rod $j$ with the foot-treadle $k$, by which the valve $h$ may be opened and the leaf upon the die P brought under the influence of the exhaust above referred to.

Upon the under side of the bed-plate A, below the die or cutter P, is suspended by lugs *l l l l* the rectangular frame *m*, the lugs being held against the bed-plate A by screws, as shown by dotted lines in Fig. 4. The frame *m* incloses the vertically-movable plate *n* and sustains in bearings *q* (see Figs. 3 and 5) the parallel shafts *s t*, carrying cams *u*, adapted upon the turning of the shafts to bear upward against and elevate the plate *n*.

Upon one end of the shaft *s* is secured the wheel A', which through the chain B' and pitman-rod D' is connected with the foot-treadle E', and through the crank-pin F', rod G', and arm H' is connected with the shaft *t*, the purpose of these connections being to enable the operator to turn the wheel A' and shaft *s* by the pressure of the foot on the treadle E' and to impart from the wheel A' a like movement to the shaft *t*, whereby the shafts *s t* may have a simultaneous movement and through the cams *u* elevate the opposite ends of the plate *n* to a corresponding extent. After the wheel A' has been turned to elevate the plate *n*, the spring I' (see Figs. 4 and 6) will, as soon as the foot is released from the treadle E', retract the wheel to its normal position, which is that shown in Fig. 4, and permit the plate *n* to assume its former position on a horizontal plane with the frame *m*. The vertical movement of the plate *n* is imparted through the rods J' J' J' J' to the rolling-table L', the latter, when the plate *n* is elevated, being raised to a level with the platen V, so that the table and platen may at that time form a continuous surface upon which the cigar may be rolled, while the leaf is held smooth by suction. When the plate *n* is lowered, the table L' will have a corresponding movement downward, so as not to interfere with the operation of the die for cutting wrappers or binders.

The table L' is shown enlarged in Fig. 2, wherein it will be seen that it consists of two plates, M', supported on a frame, N', and connected by springs P', which operate to draw them toward each other and close around the die P. The opposite ends of the plates M' are held by guides Q', which prevent the elevation of the plates from the frame N', while the die or cutter P insures the plate from slipping laterally from the said guides. The upper ends of the rods J' are united with the frame N' by screws, as shown in Fig. 5, and these rods are given a spring tension downward when the rolling-table is in an elevated position by means of the coiled springs R', which encircle the rods between the collars S' and the bed-plate A.

In the operation of the machine the leaf from which the wrappers or binders are to be cut is placed over the die P, and the valve *h* opened by pressure on the foot-treadle *k*, whereupon the exhaust will hold the leaf smooth upon the platen V, and the operator will move the arm E and thereby the rollers I I across the die, which will have the effect of cutting the blank from the leaf, after which the pressure on the treadle *k* may be relieved, and the valve *h* permitted to cut off the exhaust, whereupon the blank will be released from the platen and may be removed. This operation may be repeated until the desired number of blanks have been cut, and then, if it is desired to roll the cigars on the same machine, the table L' may be elevated by the foot-treadle E', as hereinbefore described, and the platen V and table thus utilized as a continuous surface upon which to accomplish the rolling, the treadle *k* being employed to establish the connection of the exhaust with the platen for the purpose of holding the wrapper while the cigar is being rolled. If desired, as soon as each wrapper is cut it could be rolled around the cigar, the table L' being elevated after each movement of the arm E, the rolling performed, and the treadles *k* E' then released.

The machine constructed as above described is adapted to receive dies varying in size, and hence cutting wrappers and binders for cigars of different dimensions. If the die or cutter P should be found too large for the special wrapper or binder to be cut, it will be released from the bed-plate by loosening the clamps R R, and the platen V will be detached from the rods W W by freeing the screws by which it is secured to them, whereupon a smaller die and platen could be substituted, the new die being secured by the clamps R R, and the new platen being attached to the rods W W, the latter being moved inward toward each other to meet the screw-holes in the smaller platen, the making of new screw-holes in the bed-plate A for the varying sizes of dies and in the platen to suit the position of the rods W W being thus avoided. The rods W W may be moved laterally in the slots X to suit the varying sizes of platens by turning the disks Y, which are eccentrically secured on the rods, and are of such size as to cover the slots X, no matter what position may be given to the rods W. In the drawings, the rods W W are at the outer ends of the slots X, but a one-half turn of the eccentric-disks Y would bring them to the inner end of said slots, so as to meet the screw-holes in a small platen. A person possessing one of the machines with a few different sizes of platens and dies would thus be enabled to provide wrappers for cigars of the usual sizes.

What I claim as my invention, and desire to secure by Letters Patent, is—

1. The die or cutter, the platen therein, and a device for pressing the leaf against the cutter, combined with the rolling-table encompassing the cutter, mechanism, substantially as described, for imparting a vertical movement to said table from a foot-treadle, an air-exhaust for the cutter, and mechanism, substantially as described, for applying or cutting off said exhaust from a foot-treadle, substantially as set forth.

2. The die or cutter, the platen therein, and a device for pressing the leaf on the cutter, combined with rods within the cutter for supporting the platen, the bed-plate having elongated slots for said rods, the revoluble disks covering said slots, and an air-exhaust for the cutter, substantially as set forth.

3. The die or cutter, the platen therein, and a device for pressing the leaf on the cutter, combined with the rods W W, supporting the platen, the revoluble disks Y, the bed-plate having slots X, the caps Z, and an air-exhaust for the cutter, substantially as set forth.

4. In a machine for cutting and rolling, the die or cutter mounted upon a bed-plate and a platen within the cutter held upon yielding supports, combined with the rolling-table encompassing the cutter, the plate $n$ below the cutter, the frame encompassing plate $n$, rods J', connecting the plate $n$ with the rolling-table, mechanism, substantially as described, for moving said plate $n$ vertically, and an air-exhaust for the cutter, substantially as set forth.

5. In a machine for cutting and rolling, the die and the platen therein, combined with the plates M', forming a rolling-table encompassing said die, the springs connecting said plates, the supporting-guides Q' for the plates M', mechanism, substantially as described, for moving said rolling-table vertically, and an air-exhaust for the cutter, substantially as set forth.

6. In a machine for cutting and rolling cigar wrappers or binders, the die or cutter mounted upon a bed-plate and a platen within the cutter, combined with the rolling-table encompassing the cutter, the suspended frame $m$, plate $n$, shafts $s\ t$, cams $u$ on said shafts, wheel A', chain B', rod D', foot-treadle E', rod G', arm H', and rods connecting the plate $n$ with the rolling-table, substantially as set forth.

Signed at New York, in the county of New York and State of New York, this 28th day of August, A. D. 1888.

JOHN R. WILLIAMS.

Witnesses:
CHAS. C. GILL,
W. A. C. MATTHIE.